United States Patent
Fiedler

(10) Patent No.: US 7,648,356 B2
(45) Date of Patent: Jan. 19, 2010

(54) SYSTEM FOR PRODUCING A STRIP OF DOUGH FROM A STRIP OF RAW DOUGH AND SET OF PLANETARY ROLLERS FOR USE IN SUCH A SYSTEM

(75) Inventor: Rudolf Fiedler, Langfurth (DE)

(73) Assignee: Werner & Pfleiderer Lebensmitteltechnik GmbH, Dinkelsbuhl (DE)

(*) Notice: Subject to any disclaimer, the term of this patent is extended or adjusted under 35 U.S.C. 154(b) by 122 days.

(21) Appl. No.: 11/865,500

(22) Filed: Oct. 1, 2007

(65) Prior Publication Data

US 2008/0241305 A1    Oct. 2, 2008

(30) Foreign Application Priority Data

Sep. 29, 2006  (DE) ................ 10 2006 046 501

(51) Int. Cl.
*A21C 3/02* (2006.01)
(52) U.S. Cl. .................... 425/194; 425/363; 425/367
(58) Field of Classification Search ............. 425/194, 425/363, 367
See application file for complete search history.

(56) References Cited

U.S. PATENT DOCUMENTS 4,178,147 A * 12/1979 Hayashi ............ 425/363
4,416,910 A   11/1983 Hayashi et al.
6,082,988 A *  7/2000 Muller et al. ........ 425/363
7,205,017 B2 * 4/2007 Hayashi et al. ...... 425/367

FOREIGN PATENT DOCUMENTS

| CH | 621685 A5 | 2/1981 |
|---|---|---|
| DE | 10392765 T5 | 6/2005 |
| EP | 0809438 B1 | 10/1998 |

* cited by examiner

*Primary Examiner*—James Mackey
(74) *Attorney, Agent, or Firm*—Browdy and Neimark, PLLC

(57) ABSTRACT

A system for producing a strip of dough from a strip of raw dough has a bottom pressing device and an upper pressing device with an interposed processing gap for the strip of dough. The pressing devices each have a plurality of planetary rollers that are rotatably driven about their longitudinal axes in each case. In the circumferential direction the planetary rollers are equidistantly distributed about a common central primary axis that extends parallel to the planetary longitudinal axes. The planetary rollers are jointly driveable so as to rotate about the primary axes. Each planetary roller has a middle part coming into contact with the strip of dough, and removably connected to the ends thereof and integral in rotation therewith shaft stubs. The latter are axially and radially supported on frontal head plates of the pressing devices. The dough-strip production system is easy to clean. A set of planetary rollers for use in the system has at least two planetary rollers that may differ in their dimension or material parameters. This increases the versatility of the dough-strip production system.

13 Claims, 11 Drawing Sheets

SYSTEM FOR PRODUCING A STRIP OF DOUGH FROM A STRIP OF RAW DOUGH AND SET OF PLANETARY ROLLERS FOR USE IN SUCH A SYSTEM

BACKGROUND OF THE INVENTION

1. Field of the Invention

The invention relates to a system for producing a strip of dough from a strip of raw dough having a bottom pressing device and an upper pressing device with an interposed processing gap for the strip of dough, wherein the pressing devices each have a plurality of planetary rollers that are rotatably driven about their longitudinal axes in each case which are equidistantly distributed about a common central primary axis that extends parallel to the planetary longitudinal axes, wherein the planetary rollers are jointly driveable so as to rotate about the primary axes. The invention additionally relates to a set of planetary rollers for use in such a system.

2. Background Art

A system of the type mentioned at the beginning is known from EP 0 809 438 B1. Cleaning such a system is very cumbersome. Especially the planetary rollers and regions adjacent to these clog with residual dough over time, so that regular cleaning is imperative. The cumbersome cleaning procedure leads to extended downtimes.

SUMMARY OF THE INVENTION

It is therefore an object of the present invention to improve a system of the type mentioned at the beginning in such a way that it is easier to clean.

This object is met according to the invention with a system in which each planetary roller has a middle part coming into contact with the strip of dough, and shaft stubs removably and torque proof connected to the ends thereof, the shaft stubs being axially and radially supported on frontal head plates of the pressing devices.

It was recognized according to the invention that a multi-part design of the planetary rollers with a middle part and shaft stubs disposed and supported at the ends creates the option of removing the middle parts of the planetary rollers from the shaft stubs that are disposed at the ends, for cleaning of the system. The middle parts can then easily be cleaned or exchanged against cleaned middle parts. Moreover, after detaching the middle parts, the shaft stub regions of the system and the interiors of the pressing devices are accessible to a visual inspection and optional further cleaning. Maintenance work can be simplified with respect to time and expense. The hygiene status of the dough-strip production system is optimized.

Receptacles of the shaft stubs provided for receiving torque proof ends of the middle part, are composed of multiple parts in such a way that after removal of a receptacle part the associated planetary roller is removable transversally to its longitudinal axis from the remaining pressing device. Such a multi-part design provides for a particularly simple disassembly of the planetary roller middle parts.

Receptacles being two-part in each case are particularly simple in their design.

Mounting receptacles for additional components in each case that are contactable with the dough create the option of mounting and removing additional components without much effort. The frontal head plates of the system have these mounting receptacles in the circumferential direction between adjacent bearing receptacles for the planetary rollers.

The additional components may particularly be wiper strips being contactable with the dough or freewheeling wiper rollers. Wiper strips lead to an effective removal of residual dough on the circumferential surfaces of the planetary rollers during the operation of the dough-strip production system and prevent soft dough from collapsing. For certain types of dough free-wheeling wiper rollers have proven effective in place of wiper strips.

A main drive for the common rotational drive of the planetary rollers about the primary axis has: a main drive motor, which drives via a first deflecting gear unit a main shaft of the first pressing device that extends coaxially to the primary axis via the main shaft of the first pressing device and via a second deflecting gear unit a main shaft of the second pressing device that extends coaxially to the primary axis. Such a main drive is significantly simplified over the prior-art actuation of the pressing devices about their major axes. Freewheeling shafts and complex parts that are prone to wear and tear, and particularly parts that are used for an indirect drive transmission are avoided. The aforesaid main drive may also be used advantageously in combination with one-piece planetary rollers, i.e., planetary rollers in which the shaft stubs, in contrast to the subject matter according to the invention, are actuated integrally on the middle part.

A lifting mechanism for defining a width of the gap, the lifting mechanism being designed in such a way that starting from a maximum gap, a minimum gap can be reached within a period of less than five minutes, preferably within one minute, provides for an operation of the dough-strip production system in which a separate shaft, which is generally provided in the prior art, for pulling-in or transferring of the raw dough strip or previously processed dough-strip may be dispensed with. The quick speed at which the pressing devices are moved together results in a safe and controlled pulling-in of the raw dough strip without unnecessary production of rejected dough-strips.

A housing having an inlet-side access door and an outlet-side access door, at least one of the two access doors comprising: an inspection section, which is connected via an inspection pivot hinge to a housing frame, a cover section which is connected via a cover pivot hinge to the inspection section, for covering a region adjoining the housing of an inlet and outlet conveying device for dough, provides, on one hand, by lifting the cover section, for an effortless checking of an inlet or outlet region of the system, and provides on the other hand, by lifting the inspection section, for easy access to interior components of the dough-strip production system. The housing of the latter is opened only as much as necessary for the given purpose, by means of the access door. This saves time and expenses. An access door of the aforesaid type may also be used in a dough-strip production system with different planetary rollers than according to the invention, i.e., one-piece planetary rollers, and also with a different main drive than that having a main drive motor, which drives via a first deflecting gear unit a main shaft of the first pressing device that extends coaxially to the primary axis via the main shaft of the first pressing device and via a second deflecting gear unit a main shaft of the second pressing device that extends coaxially to the primary axis.

Two access doors of the aforesaid type being provided both on the inlet side and on the outlet side provide for an accessibility of the dough-strip production system, both on the inlet and outlet side, that is adapted to the given purpose.

Adjacent inspection pivot hinges of the access doors being disposed on the top surface of the housing create a virtually unimpeded accessibility of the interior of the dough-strip production system.

A cover section being pivotable between the covered covering and operating position and a raised access position with the inspection section remaining stationary, the cover section being lockable in the access position, prevents the cover section from inadvertently dropping back into the covering and operating position.

A set of planetary rollers for use in a system for producing a strip of dough from a strip of raw dough according to the invention, the set incorporating at least two planetary rollers that differ in dimension or material parameters, increases the versatility of the dough-strip production system. It is made possible to act upon different types of dough of different consistencies with different adhesive or cohesive materials of the planetary rollers in a processing operation.

A set incorporating at least two planetary rollers that differ in an outer contour makes it possible to give the dough strip a special shape, depending on the requirements. The planetary rollers may be designed e.g., crowned or wavy, or also with a smooth, knurled or otherwise perforated or finished surface. Also possible are surface shapes of the circumferential surfaces of planetary rollers that are polygonal in the longitudinal or cross section, for example 8-, 10-, or 15-angled.

Examples for planetary rollers that differ from each other in the material of an outer circumferential dough-processing surface are plastic rollers, stainless steel rollers, and Teflon rollers. These rollers may be used in alternation, depending on the requirements placed on the system by the processing of the dough.

An exemplary embodiment of the invention will be explained in more detail below based on the drawing.

DESCRIPTION OF THE PREFERRED EMBODIMENT

Figure 1:
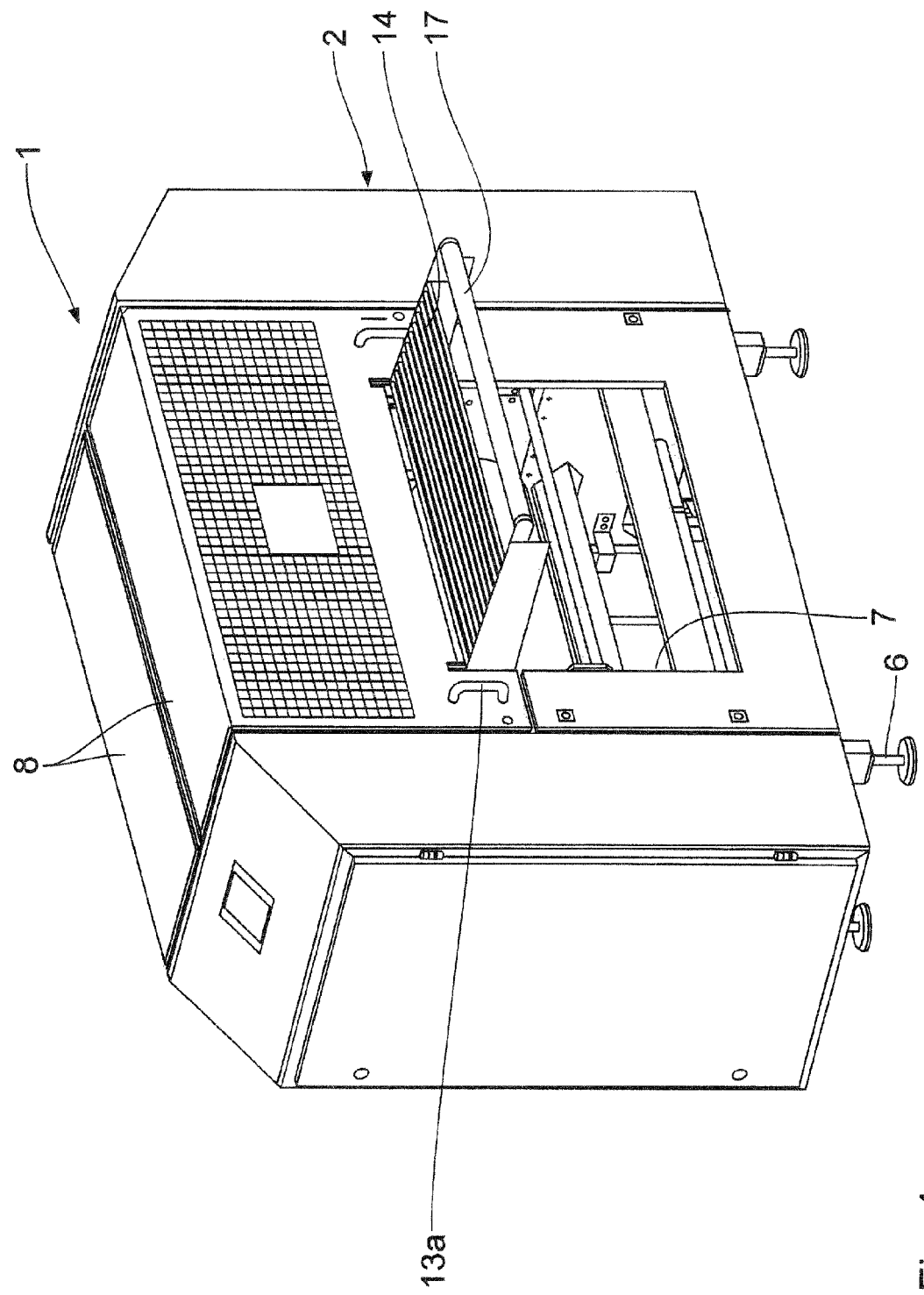
FIG. 1 shows a perspective view of a dough-strip production system with two access doors enclosing an inspection section and a cover section, with one of the access doors visible in its entirety, the inspection section being shown in a closed position and the cover section in a covering position.

A dough-strip production system 1 shown in FIG. 1 serves for producing a homogenous dough strip of relatively minor strip thickness from a thicker strip of raw dough. A system 1 of this type is also referred to as a satellite roller assembly.

Figure 5:
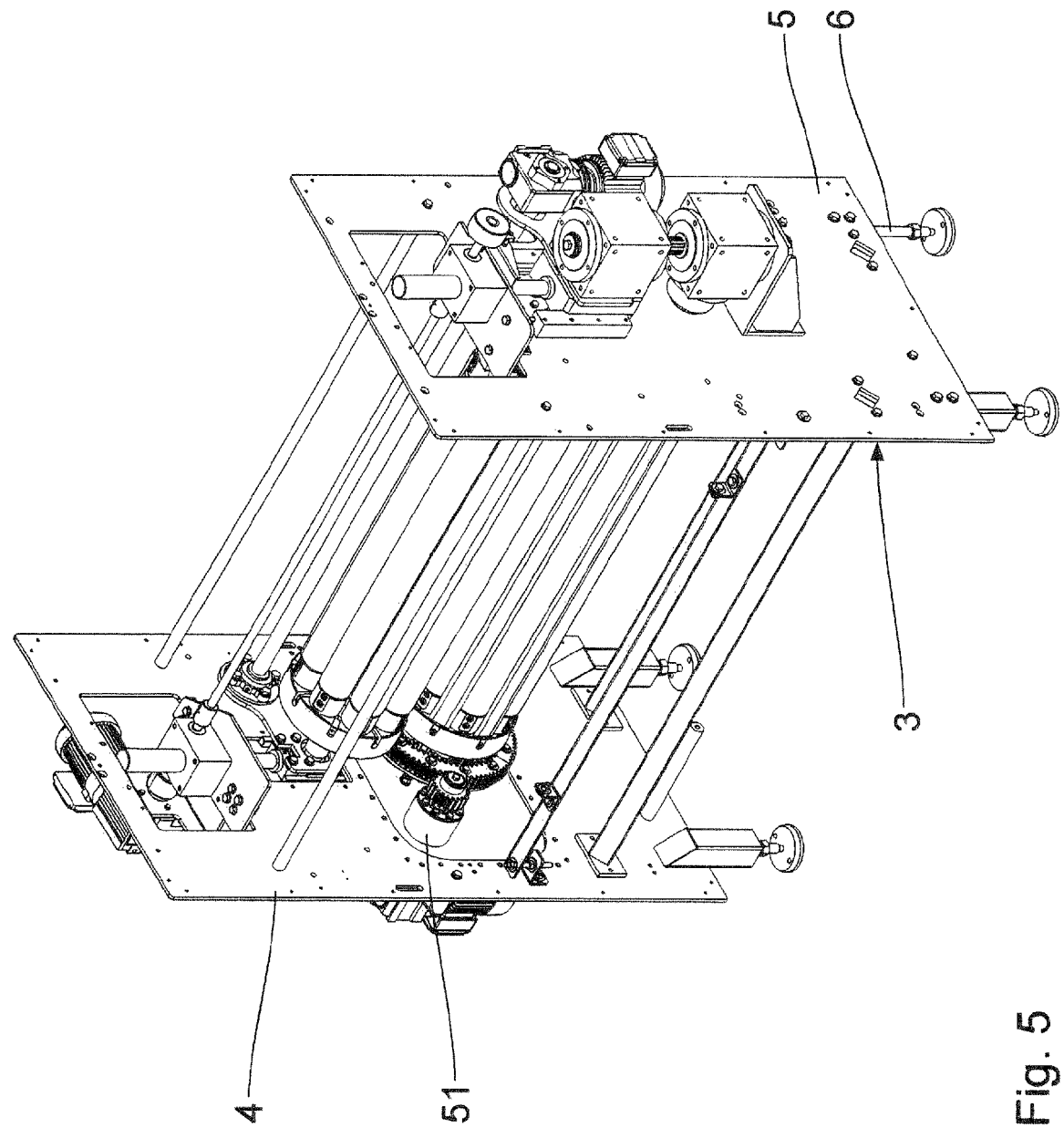
FIG. 5 shows, in a perspective view, the system according to FIG. 1 with removed housing parts.
Figure 6:
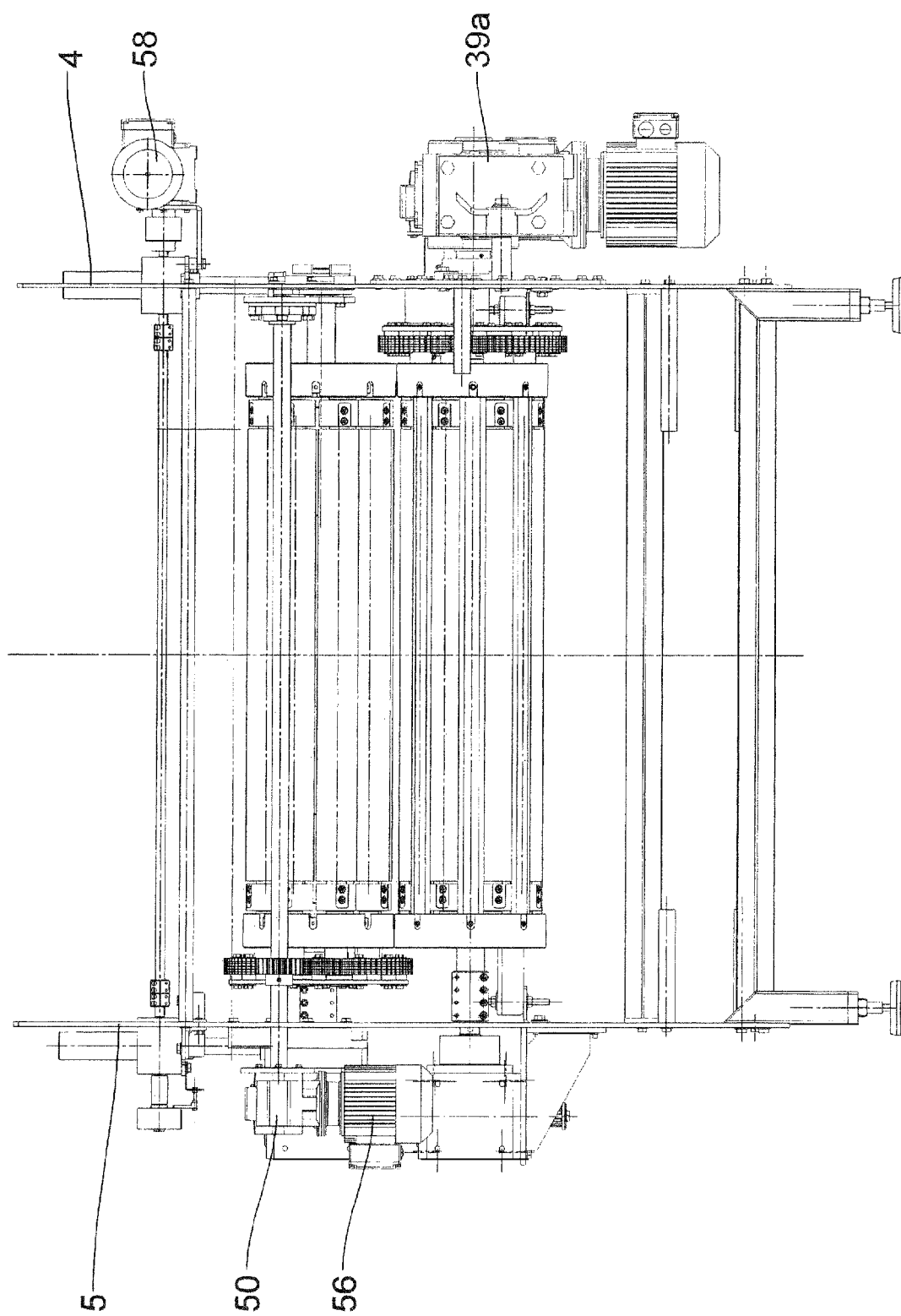
FIGS. 6 through 10 show views of the system from the front, from the rear, from the right, from the left, and from above.
Figure 7:
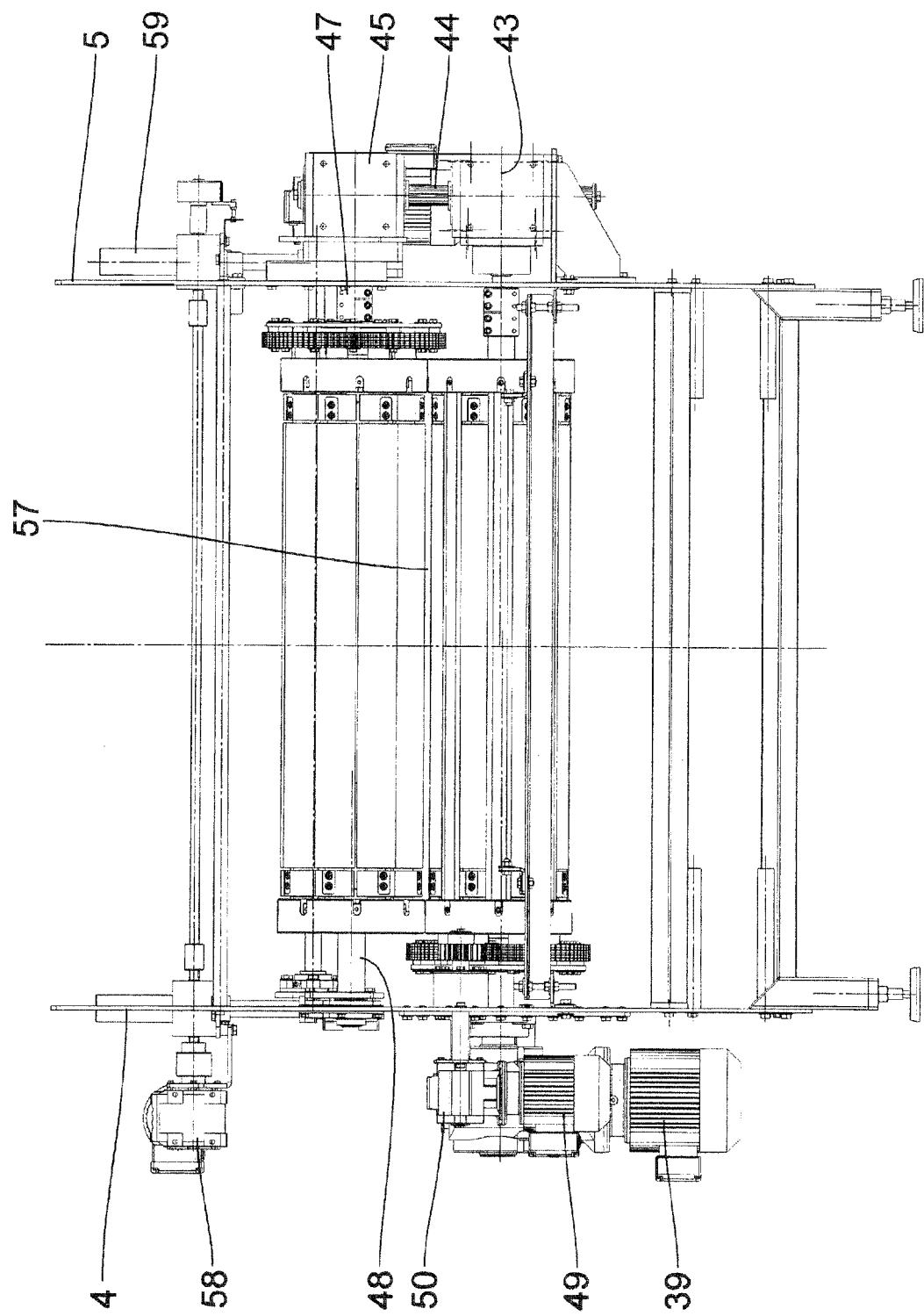
Figure 9:
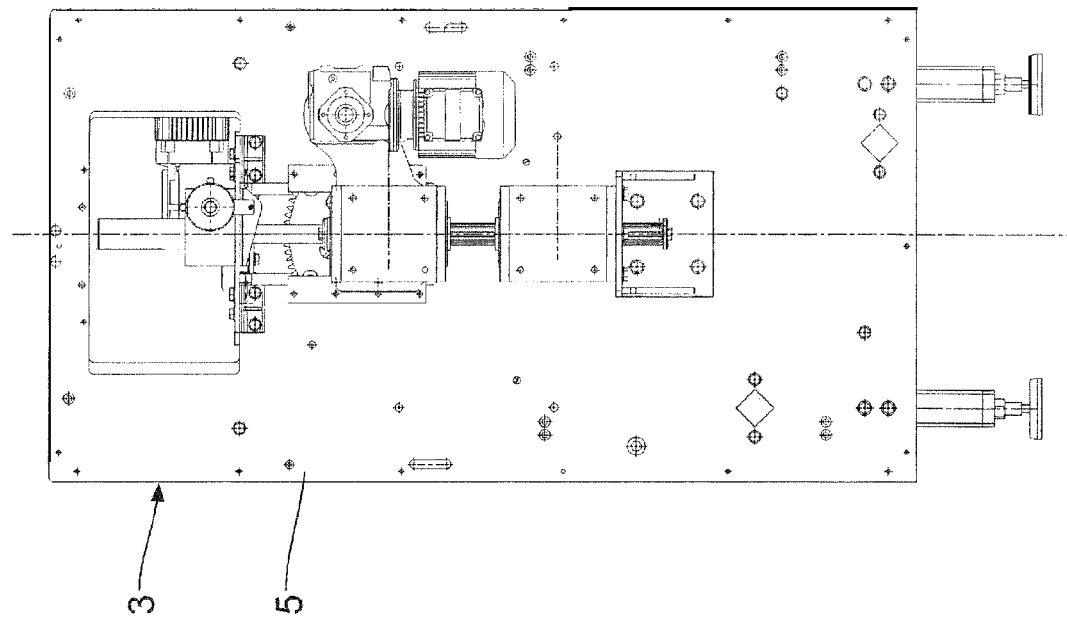
Figure 8:
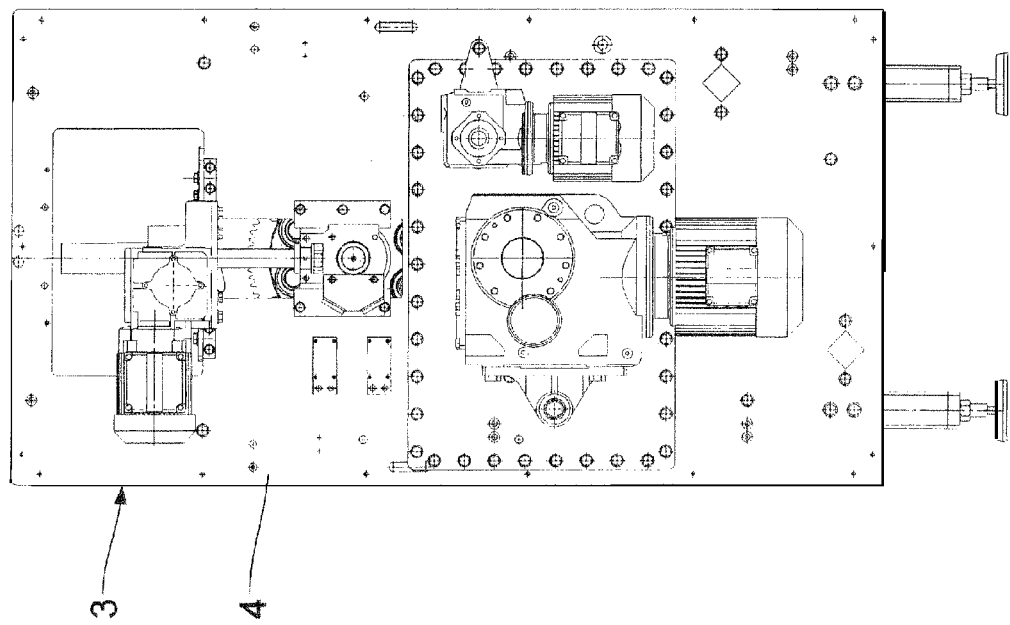
Figure 10:
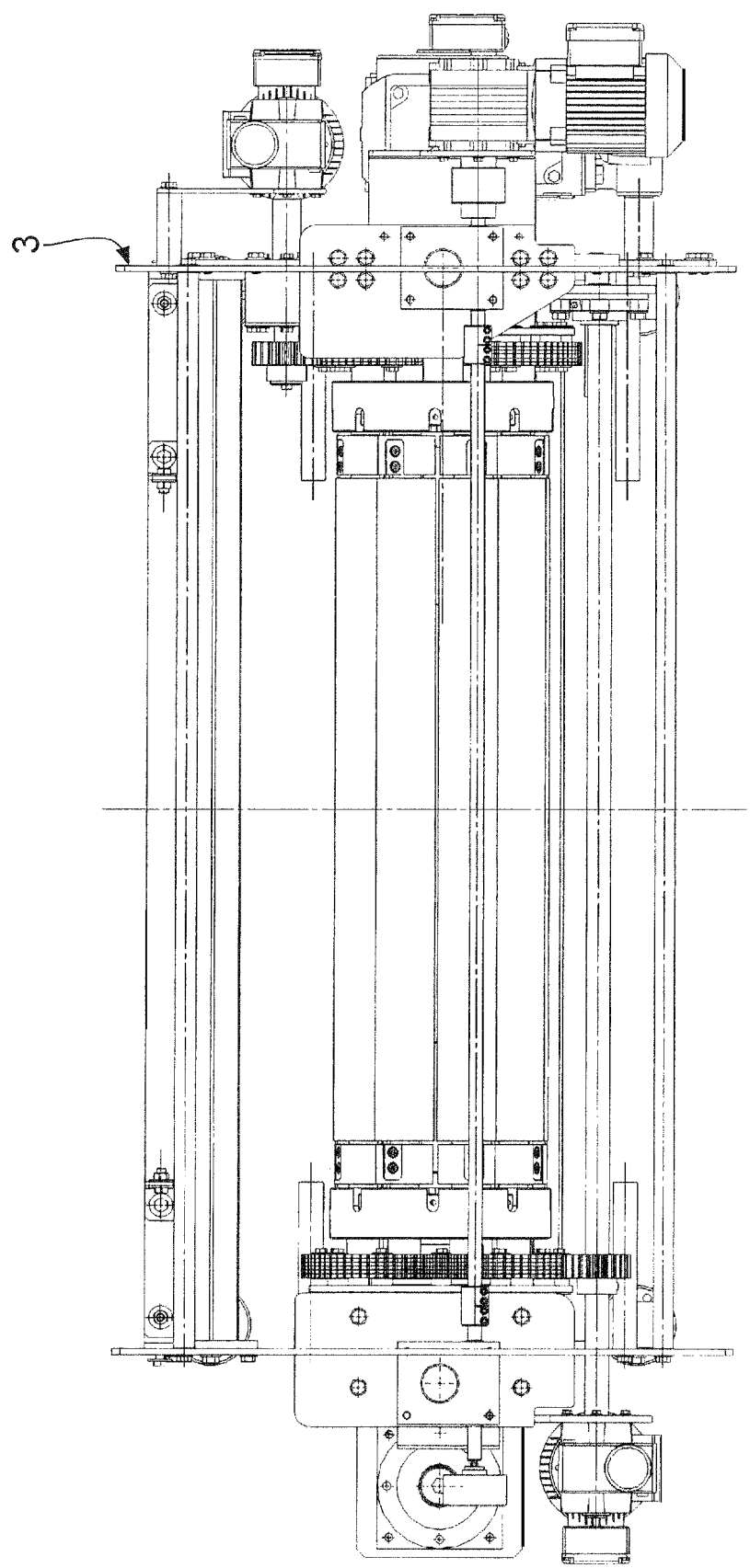

The system 1 has a housing 2 in which the components of the system 1 are accommodated together with their drives. A housing frame 3 (compare to FIG. 5) is supported via vertical frame side plates 4, 5 via support legs 6 on the floor. The strip of raw dough travels via an inlet opening 7 facing the viewer of FIG. 1 into a processing region of the system 1, and back out of the housing 2 as a fully processed dough strip via an opposite outlet opening. On the inlet side and outlet side, the system 1 has an access door 8 in each case. The two access doors 8 are designed identically, which is why it suffices to describe only the inlet-side access door 8 in the text that follows. It has an inspection section 9, which is connected on both sides via an inspection pivot hinge 10 to the frame side plates 4, 5 of the housing frame 3. The inspection section 9 is L-shaped in cross section and has a housing roof section 11 and adjoining thereto at a 90° angle a housing front-wall section 12. The housing front-wall section 12 is designed in parts in the form of a grid so that it is possible to look into the interior of the system 1 through this section of the access door 8.

Figure 2:
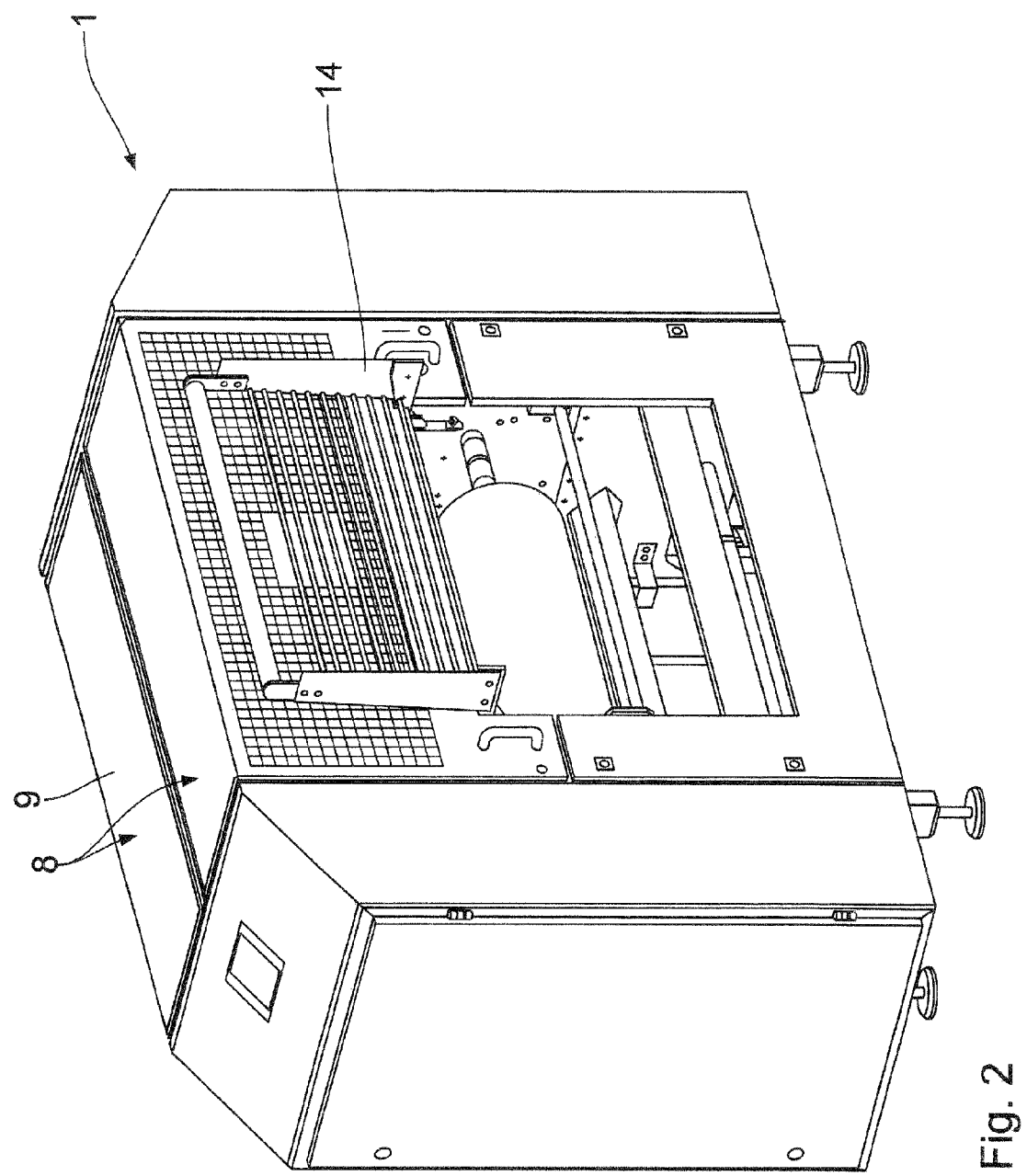
FIG. 2 shows the system according to FIG. 1, with the visible cover section pivoted into a raised access position.
Figure 3:
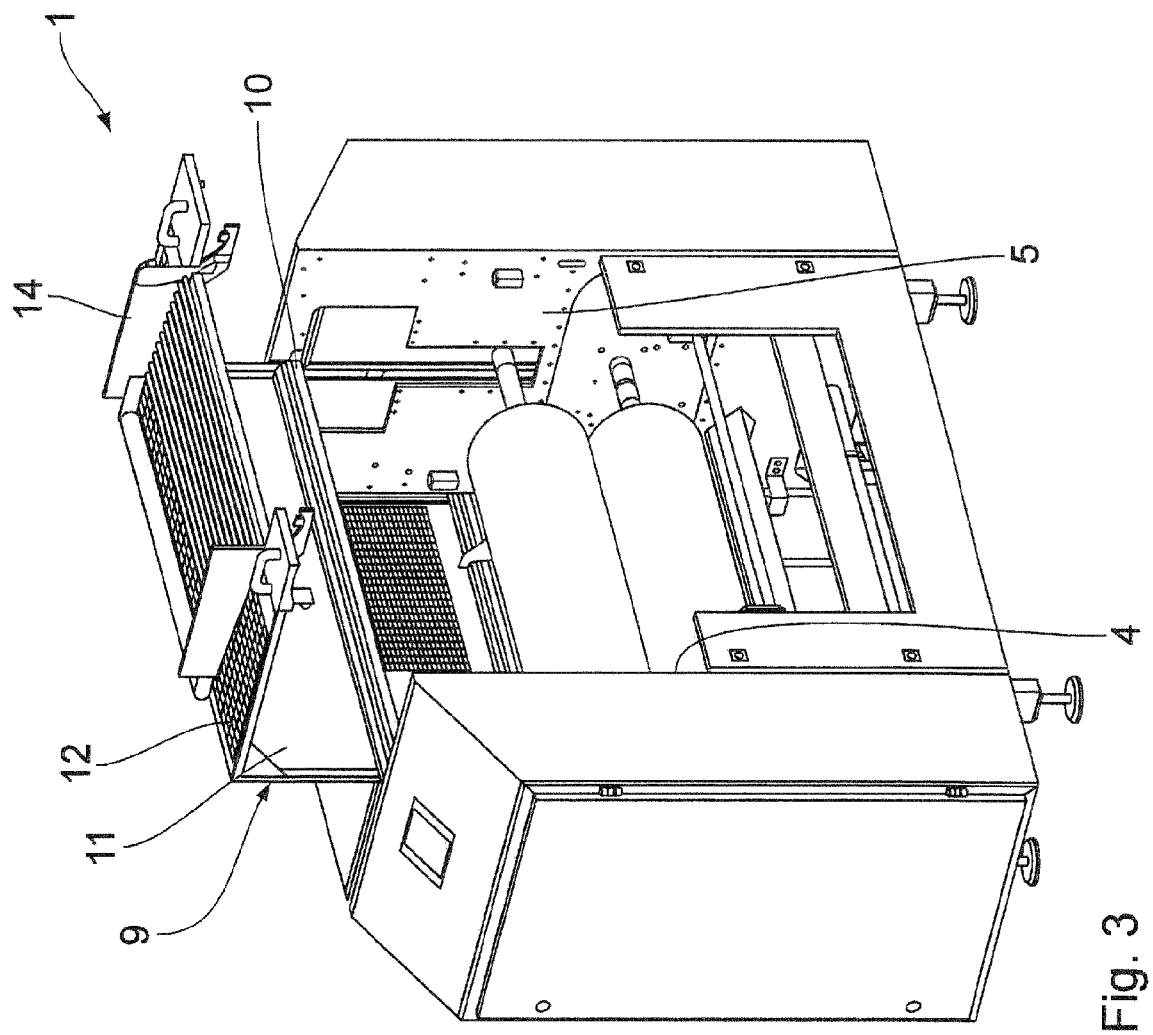
FIG. 3 shows the system according to FIG. 1, in which the inspection section of the fully visible access door is pivoted into an inspection position.
Figure 4:
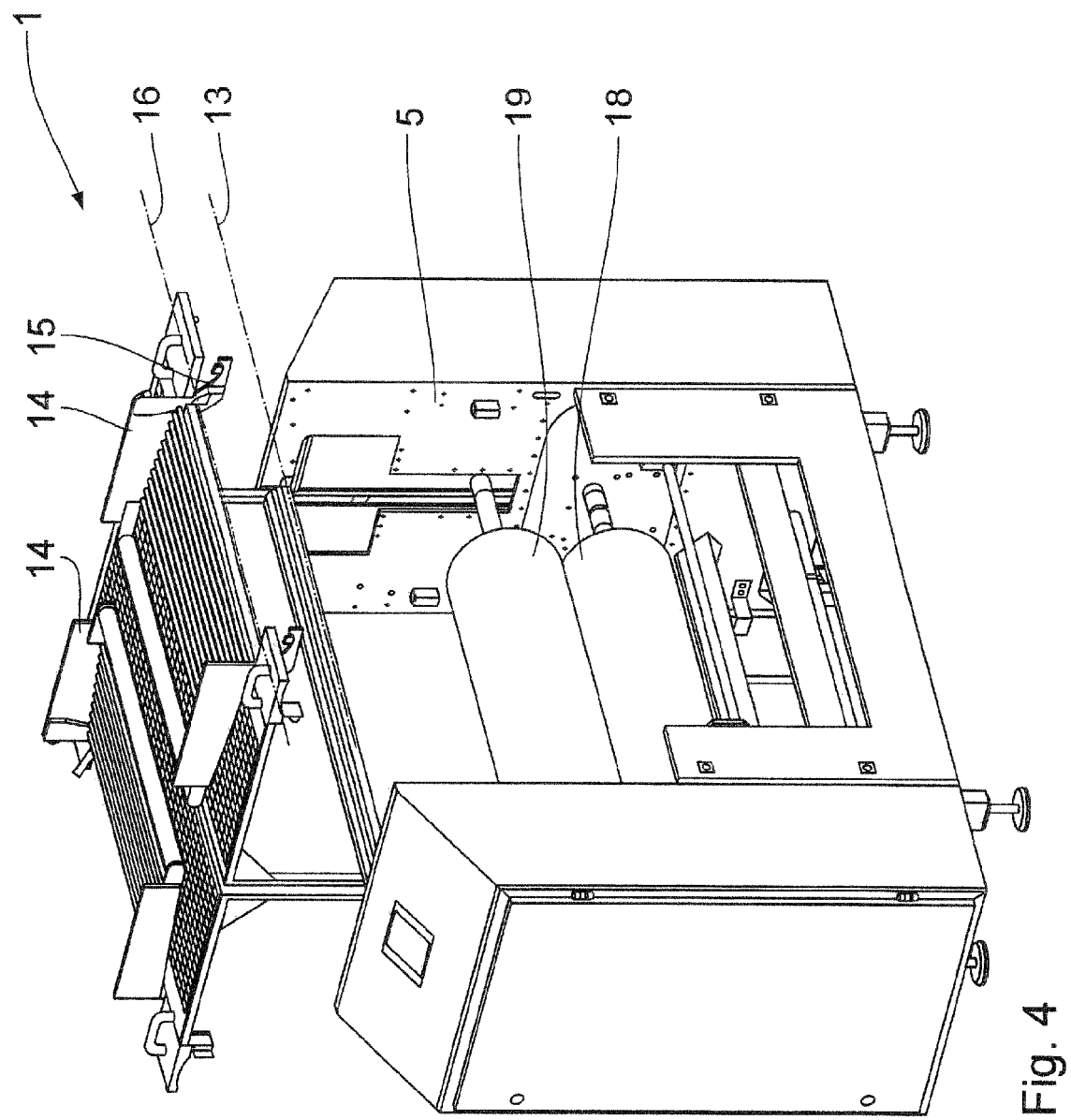
FIG. 4 shows the system according to FIG. 1, in which the inspection sections of both access doors are pivoted into the inspection position.

The inspection section 9 can be pivoted between an operating position shown in FIGS. 1 and 2 and an upwardly pivoted inspection position shown in FIGS. 3 and 4 by pivoting it about the inspection pivot element 10 about a pivot axis 13. In the operating position of the inspection section 9, access to interior components of the system 1 is very limited at best. In the inspection position of the inspection section, almost unimpeded access is possible to the interior components of the system 1, e.g., for cleaning, maintenance, adjusting, or assembly purposes. For pivoting purposes the inspection section 9 may be grasped by handles 13a.

A cover section 14 is connected via a cover pivot hinge 15 to the housing front-wall section 12 in the region of the opening 7 for the dough inlet and outlet.

The cover section 14 is largely also designed in the form of a metal grid, so that it is possible to look into the interior of the system 1 through the cover section 14. The cover section 14 may be pivoted between a covered or operating position depicted in FIG. 1 and an access position depicted in FIGS. 2 through 4 about a pivot axis 16 of the cover pivot hinge 15 that extends parallel to the pivot axis 13 at a distance to the same. In the covering position the cover section 14 projects over the front wall of the housing 2 in a 90° configuration and covers a region of an inlet and outlet conveying means for dough that adjoins the housing 2, with which the strip of raw dough is fed to the system 1 on one hand and with which the fully processed dough strip is removed from the system 1 on the other hand. In the access position that is pivoted upward by 90°, the cover section 14 uncovers the inlet opening 7 or outlet opening, respectively, so that components adjacent to the openings are accessible for certain monitoring purposes. For the monitoring of interior components of the housing 2 it is therefore not necessary to pivot up the entire inspection section 9, instead it suffices to pivot up the lighter-weight cover section 14. The cover section 14 is grasped for this purpose by a handle strip 17. In the access position the cover section 14 is locked, e.g., by means of a securing lever, which is not depicted, or by means of a pretensioned and manually releasable safety latch, so that the cover section 14 is reliably prevented from inadvertently dropping from the access position back into the covering position.

The two access doors 8 have inspection pivot hinges that are closely adjacent to each other on the roof, such that the inspection pivot axes 13 are closely adjacent to each other as well. As soon as both access doors 8 are pivoted upward into the inspection position, the interior of the system 1 is accessible virtually unimpeded. With both access doors 8 in the inspection position the housing 2 is reminiscent of a motor vehicle body with gull-wing doors.

For processing the dough strip, the system 1 has a pressure module with a bottom pressing device 18 and top pressing device 19. The pressing devices 18, 19 are depicted schematically in FIGS. 1 through 4. In detail the pressing devices 18, 19 are shown particularly in FIG. 11, with individual elements, particularly of the upper pressing device 19, having been left out in FIG. 11.

Figure 11:
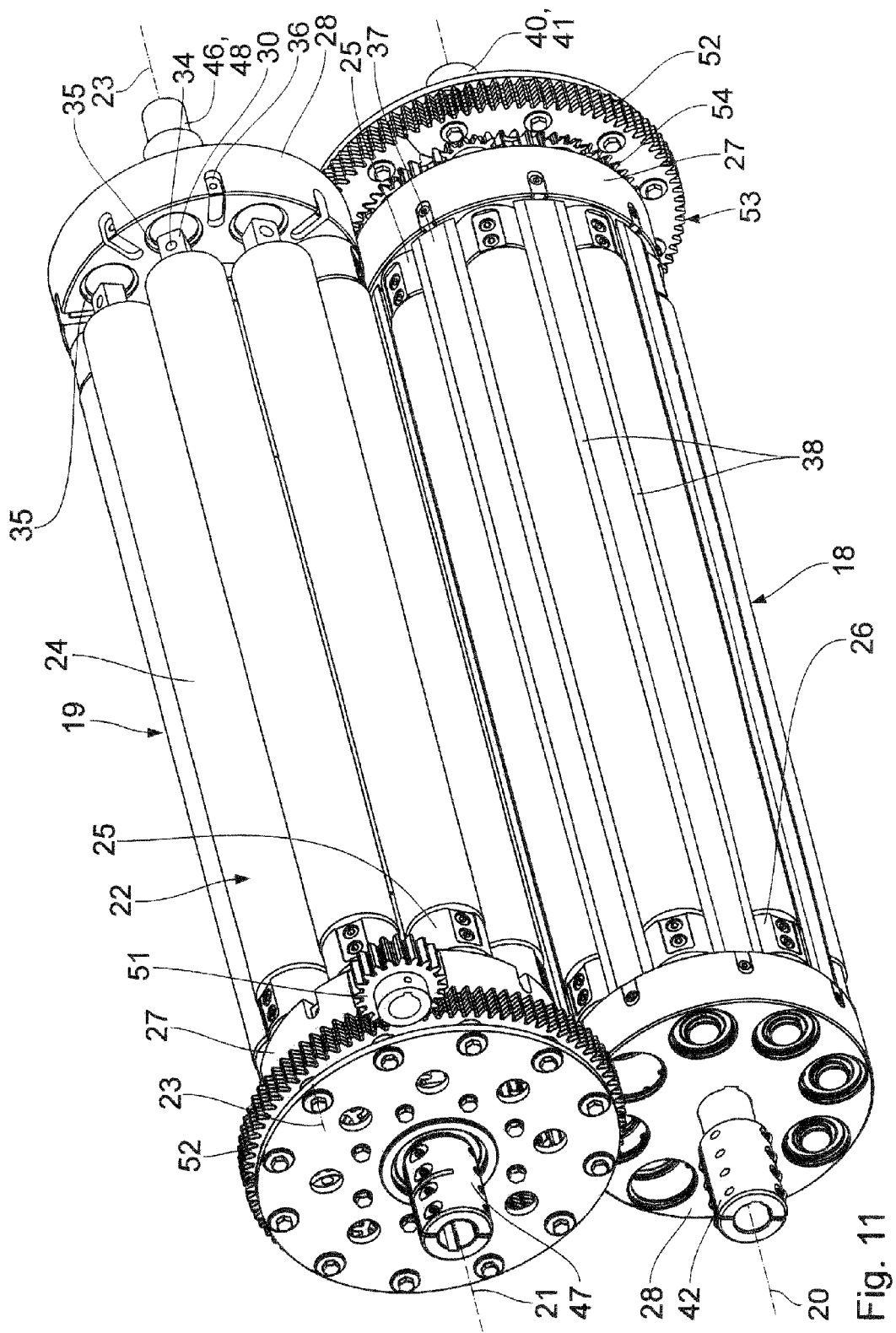
FIG. 11 shows, in an enlarged view, a pressure module of the system of FIG. 1, with a top pressing device and a bottom pressing device.
Figure 13:
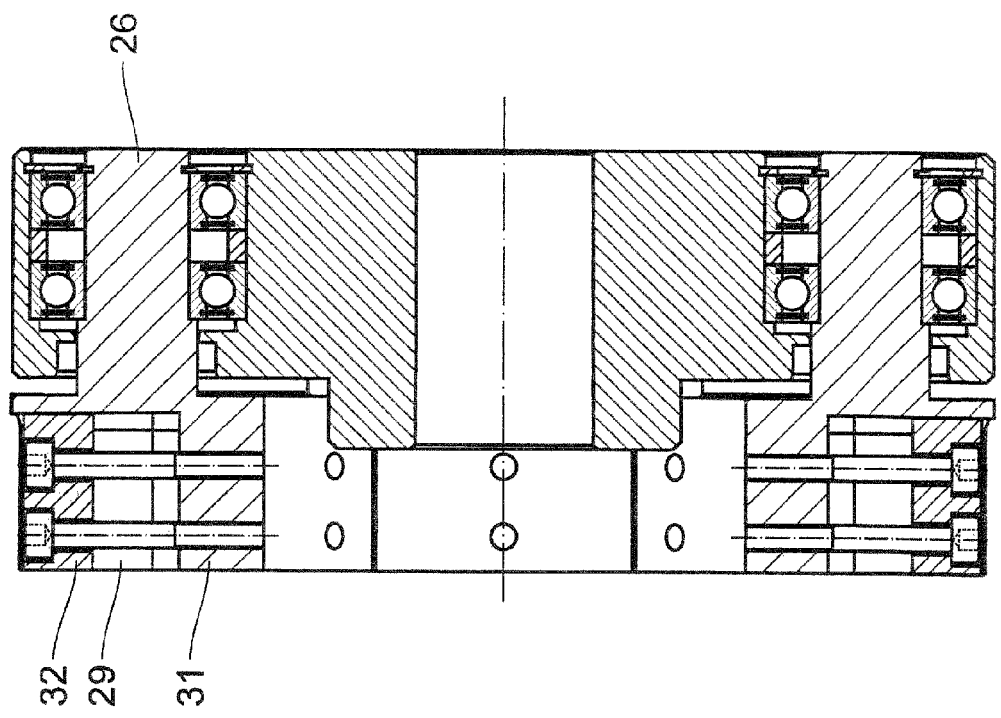
FIG. 13 shows a non-driven head plate of a pressing device of the pressure module of FIG. 11 in an axial section.
Figure 12:
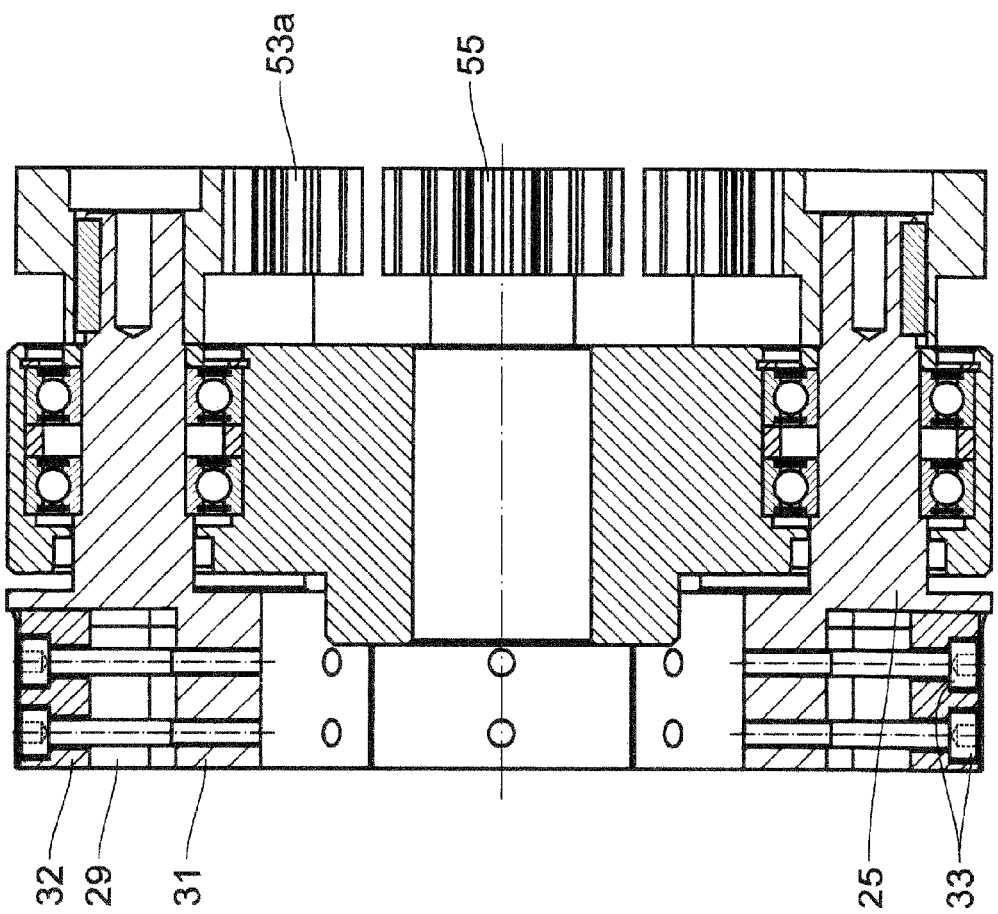
FIG. 12 shows a driven head plate of a pressing device of the pressure module of FIG. 11 in an axial section.

Each pressing device 18, 19, has a cylindrical outer contour and is rotatably driven about an axis of rotation 20, 21, which is co-located with the cylinder axis of this outer contour. Each pressing device 18, 19 has a plurality of, in the present example eight, planetary rollers 22. Each planetary roller 22 is rotatably driven about its longitudinal axis 23. The longitudinal axes extend parallel to the axes of rotation 20, 21 of the associated pressing device 18, 19 and have the same spacing from the same and are distributed equidistantly in the circumferential direction. The axes of rotation 20, 21 each represent a central principal axis of the pressing devices 18, 19. Each planetary roller 22 has a middle part 24 coming into contact with the dough strip, and shaft stubs 25, 26 removably connected to the ends of the same and integral in rotation therewith, i.e. torque proof connected therewith. Each planetary roller 22 has a shaft stub 25 of the driven type, which is depicted in FIG. 12 and a shaft stub 26 of the non-driven type, which is depicted in FIG. 13. The shaft stubs 25, 26 are supported axially and radially on frontal head plates 27, 28 of the pressing devices 18, 19. The head plate 27 shown on the night in FIG. 11 of the bottom pressing device 18 and the head plate 27 shown on the left in FIG. 11 of the upper pressing device are head plates of the driven type. The head plate 28 shown on the left in FIG. 11 of the bottom pressing device 18 and the head plate 28 shown on the right in FIG. 11 of the upper pressing device 19 are head plates of the non-driven type.

Receptacles 29 of the shaft stubs 25, 26 serve to accommodate, integral in rotation therewith, square ends 30 of the planetary rollers 22. The receptacles 29 consist of two parts. A stationary receptacle part 31 is joined in one piece with the respective associated shaft stub 25, 26. A removable receptacle part 32 is screwed by means of two screws 33 with countersunk hexagon socket heads to the stationary receptacle part 31 in each case. With the middle part 24 installed, the screws 33 extend through through-bores 34 in the ends 30. The receptacles 29 are formed in each case between the receptacle parts 31, 32. In a certain position of rotation of the planetary rollers 22, which is shown in FIG. 11, all hexagon socket heads of the screws 33 are accessible from the outside. After removal of the screws 33 and detaching of the removable receptacle parts 32, the associated planetary roller 22 can be removed transversely to its longitudinal axis 23 from the stationary receptacle parts 31 so that the planetary roller 22 can be cleaned or replaced.

Provided in the circumferential direction between adjacent bearing receptacles 35 of the head plates 27, 28, are mounting receptacles 36 in the head plates 27, 28 for additional components that are contactable with the dough. Depicted in FIG. 11, as an example for such components, are wiper strips 37, which wipe residual dough off the circumferential surfaces of the planetary rollers 22. The wiper strips 37 have wiper blades 38 facing the inwardly adjoining planetary rollers 22 and are disposed at a short distance from the circumferential surfaces. In lieu of wiper strips, freewheeling wiper rollers may be mounted in the mounting receptacles 36, which wipe residual dough off the circumferential surfaces of the adjacent planetary rollers 22 through rolling contact with the same. The wiper strips or wiper rollers can additionally prevent soft dough from collapsing.

The joint rotational actuation of all planetary rollers 22 of the pressing devices 18, 19 about the primary axes 20, 21 is accomplished by means of a main drive motor 39, which is mounted on the frame side plate 4. The main drive motor 39 drives, via a 90° deflecting gear unit 39a, a shaft stub 40 that is connected, integral in rotation therewith, to the driven head plate 27 of the bottom pressing device 18. The shaft stub 40 is part of a bottom main shaft 41, which extends longitudinally relative to the axis of rotation 20. The main shaft 41 ends across from the shaft stub 40 in a second shaft stub 42, which is connected, integral in rotation therewith, to the head plate 28 of the bottom pressing device 18. The main shaft 41 of the bottom pressing device 18 drives, via an additional 90° deflecting gear unit 43, which is mounted on the side plate 5, a short transfer shaft 44. The transfer shaft 44 drives, via an additional 90° deflecting gear unit 45, which is also mounted on the side plate 5, a main shaft 46 of the upper pressing device 19, which, like the main shaft 41 of the bottom pressing device 18, incorporates two shaft stubs 47, 48. The shaft stub 48 that is situated on the 90° deflector gear unit is mounted in the frame side plate 4 so as to be able to rotate.

Provided for the rotational actuation of the planetary rollers 22 of the bottom pressing device 18 is a bottom roller drive motor 49, which is mounted on the frame side plate 4. The roller drive motor 49 drives, via a 90° deflecting gear unit 50, a driving pinion 51, which rotates about an axis parallel to the axes of rotation 20, 21. The driving pinion 51 engages into an external toothed rim 52 of a planetary gear 53, which is mounted on the driven head plate 27. Via planetary rollers 53a, which run between an internal toothed rim 54 that is disposed across from the external toothed rim 52 and an internal toothed rim 55, and which are connected to the driven shaft stubs 25 integral in rotation therewith, the planetary rollers 22 of the bottom pressing device 18 are rotationally driven via the planetary gear 53.

In corresponding fashion an additional roller drive motor 56, which is mounted on the frame side plate 5, drives the planetary rollers 22 of the upper pressing device 19. Components of the drive of the planetary rollers 22 of the upper pressing device 19 that correspond to those of the drive of the planetary rollers 22 of the bottom pressing device 18 therefore carry the same reference numerals and will not be explained again in detail.

Defining the width of a gap 57 of the system 1 through which the strip of dough that is to be processed passes is accomplished with a lifting mechanism motor 58, which is mounted on the frame side plate 4. The lifting mechanism motor 58 drives lifting guide elements in the form of vertical lifting guide rods 59, which are connected to the shaft stubs 47, 48 of the upper pressing device 19. The lifting guide rod 59 that is associated with the frame side plate 5 is firmly attached to the 90° deflecting gear unit 45 and to the roller drive motor 56 which, in turn, are displaceable in the vertical direction relative to the frame side plate 5. To keep the 90° deflecting gear unit 45 in engagement with the transfer shaft 44 in each lifting position, the transfer shaft 44 is designed as a longitudinally toothed shaft that completely penetrates through the 90° deflecting gear unit 45. The 90° deflecting gear unit 45 can be displaced along the longitudinal axis of the transfer shaft 44 during the lifting adjustment of the upper pressing device 19 for adjustment of the gap 57.

The lifting mechanism motor 58 has a sufficiently high drive speed so that, starting from a maximum gap of 57, a minimum gap 57 between the pressing devices 18, 19, can be reached within a period of less than five minutes, In a preferred embodiment of the lifting mechanism motor 58, switching between the maximum and minimum gap 57 can take place even within one minute.

The system 1 may have a set that is composed of a plurality of planetary rollers 22. This set may include at least two planetary rollers 22 that differ in their dimension or material parameters. The planetary rollers 22 may differ particularly in their outer contours and in the material of a circumferential outer dough-processing surface. For example, plastic rollers, stainless steel rollers, Teflon rollers and rollers with smooth, knurled or otherwise perforated or finished surface may be used in alternation. The rollers may also be crowned or wavy or polygonal in their cross section or longitudinal section to give the strip of dough a special shape.

What is claimed is:

1. A system (1) for producing a strip of dough from a strip of raw dough
   having a bottom pressing device (18) and an upper pressing device (19) with an interposed processing gap (57) for the strip of dough,
   wherein the pressing devices (18, 19) each have
   a plurality of planetary rollers (22) that are rotatably driven about their longitudinal axes (23) in each case which are equidistantly distributed about a common central primary axis (20, 21) that extends parallel to the planetary longitudinal axes (23),
   wherein the planetary rollers (22) are jointly driveable so as to rotate about the primary axes (20, 21),
   wherein each planetary roller (22) has a middle part (24) coming into contact with the strip of dough, and shaft stubs (25, 26) removably and torque proof connected to the ends thereof, the shaft stubs (25, 26) being axially and radially supported on frontal head plates (27, 28) of the pressing devices (18,19).

2. A system according to claim 1, wherein receptacles (29) of the shaft stubs (25, 26) provided for torque proof receiving ends (30) of the middle part (24), are composed of multiple parts in such a way that after removal of a receptacle part (32) the associated planetary roller (22) is removable transversally to its longitudinal axis (23) from the remaining pressing device (18, 19).

3. A system according to claim 2, wherein the receptacles (29) are two-part receptacles.

4. A system according to claim 2, wherein the frontal head plates (27, 28) have, in the circumferential direction between adjacent bearing receptacles (35) for bearing the shaft stubs (25, 26) of the planetary rollers (22), mounting receptacles (36) for additional components (37) in each case that are contactable with the dough.

5. A system according to claim 4, comprising wiper strips (37) as additional components that are contactable with the dough.

6. A system according to claim 1, wherein a main drive for common rotational drive of the planetary rollers (22) about their respective primary axis (20, 21) has:
   a main drive motor (39), which drives
   via a first deflecting gear unit (39*a*) a main shaft (41) of a first pressing device (18) that extends coaxially to the primary axis (20), the first pressing device (18) being one of the bottom and the upper pressing device,
   via the main shaft (41) of the first pressing device (18) and via a second deflecting gear unit (43 through 45) a main shaft (46) of a second pressing device (19) that extends coaxially to the primary axis (21), the second pressing device (19) being the other of the bottom and the upper pressing device.

7. A system according to claim 1, comprising a housing (2) having an inlet-side access door (8) and an outlet-side access door (8), at least one of the two access doors (8) comprising:
   an inspection section (9), which is connected via an inspection pivot hinge (10) to a housing frame (3),
   a cover section (14) which is connected via a cover pivot hinge (15) to the inspection section (9), for covering a region adjoining the housing (2) of an inlet and outlet conveying device for dough.

8. A system according to claim 7, wherein both of the access doors (8) include the inspection section and the cover section.

9. A system according to claim 8, wherein the two access doors (8) have adjacent inspection pivot hinges (10) disposed on the top surface of the housing (2).

10. A system according to claim 7, wherein, with the inspection section (9) remaining stationary, the cover section (14) is pivotable between the covered covering and operating position and a raised access position, the cover section (14) being lockable in the access position.

11. A system (1) for producing a strip of dough from a strip of raw dough according to claim 1,
    wherein said plurality of planetary rollers comprise a set of planetary rollers (22) incorporating at least two planetary rollers (22) that differ in dimension or material parameters.

12. A system according to claim 11, incorporating at least two planetary rollers (22) that differ in an outer contour.

13. A system according to claim 11, incorporating at least two planetary rollers (22) that differ in the material of an outer circumferential dough-processing surface.

* * * * *